US012812005B2

(12) United States Patent
Krivenok et al.

(10) Patent No.: US 12,812,005 B2
(45) Date of Patent: Nov. 24, 2026

(54) VIRTUAL LOCAL AREA NETWORK (VLAN) AND SUBNET SHARING IN A STORAGE SYSTEM NODE

(71) Applicant: Dell Products L.P., Round Rock, TX (US)

(72) Inventors: Dmitry Vladimirovich Krivenok, Dublin (IE); Vasiliy M. Tolstoy, Dublin (IE)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 18/825,227

(22) Filed: Sep. 5, 2024

(65) Prior Publication Data

US 2026/0067359 A1    Mar. 5, 2026

(51) Int. Cl.
*H04L 67/1095* (2022.01)
*H04L 61/103* (2022.01)
*H04L 67/1097* (2022.01)

(52) U.S. Cl.
CPC ........ *H04L 67/1095* (2013.01); *H04L 61/103* (2013.01); *H04L 67/1097* (2013.01)

(58) Field of Classification Search
None
See application file for complete search history.

(56) References Cited

U.S. PATENT DOCUMENTS 7,840,902 B2 11/2010 Graves et al.
8,458,303 B2 6/2013 Moreman et al.
10,785,056 B1 9/2020 Mathur et al.
10,880,123 B1 12/2020 Brissette et al.
11,539,554 B2 12/2022 Dutta
11,848,910 B1 * 12/2023 Zou ........................ H04L 41/044
2016/0105392 A1 * 4/2016 Thakkar .............. H04L 61/5061 709/220
2023/0231827 A1 * 7/2023 Tang .................. H04L 12/4641 709/245

OTHER PUBLICATIONS

Davoli, "VXVDEX: Internet of threads and networks of namespaces", Aug. 18, 2017, IEEE, 2017 IEEE International Conference on Communications (ICC) (2017, pp. 1-6) (Year: 2017).*

* cited by examiner

*Primary Examiner* — Davoud A Zand
(74) *Attorney, Agent, or Firm* — BainwoodHuang

(57) ABSTRACT

Within a storage node having a default network namespace and at least one additional network namespace, a virtual ethernet tunnel is created connecting the default network namespace and the additional network namespace. The virtual ethernet tunnel includes a local virtual ethernet device in the default network namespace and a remote virtual ethernet device in the additional network namespace. A Media Access Control (MAC) address of the remote virtual ethernet device of the virtual ethernet tunnel is changed to a MAC address of a network interface controller of the storage node. A traffic mirroring and redirection engine within the default network namespace is configured to route network packets within the storage node such that a virtual local area network and a subnetwork are shared by the default network namespace and the additional network namespace.

17 Claims, 4 Drawing Sheets

VIRTUAL LOCAL AREA NETWORK (VLAN) AND SUBNET SHARING IN A STORAGE SYSTEM NODE

TECHNICAL FIELD

The present disclosure relates generally to sharing of Virtual Local Area Networks (VLANs) and subnets, and more specifically to technology that shares one or more VLANs and/or one or more subnets between different network namespaces that are contained in a storage system node.

BACKGROUND

Data storage systems include one or more physical or virtual data storage nodes that are made up of hardware and/or software, and that service host I/O requests received from physical and/or virtual host machines ("hosts"). Host I/O requests received by a node specify user data that is written and/or read by the hosts. The node executes software that processes the host I/O requests by performing various data processing tasks to organize and persistently store the user data in non-volatile data storage.

The data storage services provided by a data storage system node may include services such as block storage services and file storage services. These services may be implemented by one or more native applications and one or more containerized applications. The native applications use a default network stack executing within a default network namespace. Each containerized application uses its own separate network stack, which is optimized for the containerized application, and which operates within a separate network namespace that is created for its container.

A Virtual Local Area Network (VLAN) is a broadcast domain that is isolated within a computer network. VLAN tagging adds tags to individual network frames to identify the specific VLAN to which each frame belongs. VLAN technology advantageously allows sharing of an underlying communication infrastructure by multiple VLANs while maintaining logical separation between individual VLANs.

A subnetwork ("subnet") is a logical subdivision of an IP (Internet Protocol) network. A specific subnet is indicated by the contents of the most significant bits in an IP address. Devices that belong to the same subnet have identical most-significant bits in their IP addresses.

SUMMARY

In the disclosed technology, within a storage node having a default network namespace and at least one additional network namespace, a virtual ethernet tunnel is created connecting the default network namespace and the additional network namespace. The virtual ethernet tunnel includes a local virtual ethernet device that is located in the default network namespace and a remote virtual ethernet device that is located in the additional network namespace. A Media Access Control (MAC) address of the remote virtual ethernet device of the virtual ethernet tunnel is changed to a MAC address of a network interface controller of the storage node. A traffic mirroring and redirection engine within the default network namespace is configured to route network packets within the storage node such that a virtual local area network and a subnetwork are shared by the default network namespace and the additional network namespace.

In some embodiments, configuring the traffic mirroring and redirection engine includes creating some number of network packet filters. The network packet filters include a network packet filter that unconditionally redirects network packets leaving the additional network namespace to the network interface controller of the storage node.

In some embodiments, the network packet filters further include at least one network packet filter that causes all broadcast network packets that are received by the network interface controller of the storage node and that belong to the shared virtual local area network to be mirrored to the additional network namespace.

In some embodiments, the network packet filters further include at least one network packet filter that causes all broadcast network packets that are received by the network interface controller of the storage node and that do not belong to any virtual local area network to be mirrored to the additional network namespace.

In some embodiments, the network packet filters further include at least one network packet filter that causes all network packets that are received by the network interface controller of the storage node and that both belong to the shared virtual local area network and are directed to any one of one or more Internet Protocol (IP) addresses in a set of IP addresses located within the additional network namespace to be redirected to the additional network namespace.

In some embodiments, the network packet filters further include at least one network packet filter that causes all unicast Address Resolution Protocol (ARP) replies received by the network interface controller of the storage node that belong to the shared virtual local area network, and all unicast ARP replies received by the network interface controller of the storage node that do not belong to any virtual local area network, to be mirrored to the additional network namespace.

In some embodiments, the network interface controller of the storage node may be a physical network interface controller.

In some embodiments, the network interface controller of the storage node may be a virtual network interface controller.

In some embodiments, creating the network packet filters includes a control plane within the mirroring and redirection engine attaching the at least one network packet filter to an ingress queue of at least one network device in the storage node.

The disclosed technology is integral to a technical solution to the problem of sharing a virtual local area network and a subnetwork within a node of a data storage system. The disclosed technology advantageously enables multiple different network stacks that operate in different network namespaces to share a virtual local area network and a subnetwork over a single network interface controller (physical or virtual). Such sharing is important when a node includes one or more native applications and one or more containerized applications. Using the disclosed technology, the containerized applications are allowed to use any specific network stack that may be optimal for their operation.

Additionally, the disclosed technology is fully compatible with virtualized/HCl (Hyper-Converged Infrastructure) and public cloud deployments of storage systems, and does not require the introduction of any extra MAC (Media Access Control) addresses behind the virtual network interface controllers (vNICs) used in such deployments.

Because no extra MAC addresses are introduced for any number of containerized network stacks, the disclosed technology is also advantageous in storage systems that execute directly on hardware ("bare-metal" deployments), because the NIC does not have to be put into promiscuous mode even for large numbers of containerized network stacks, thus avoiding potential security problems.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
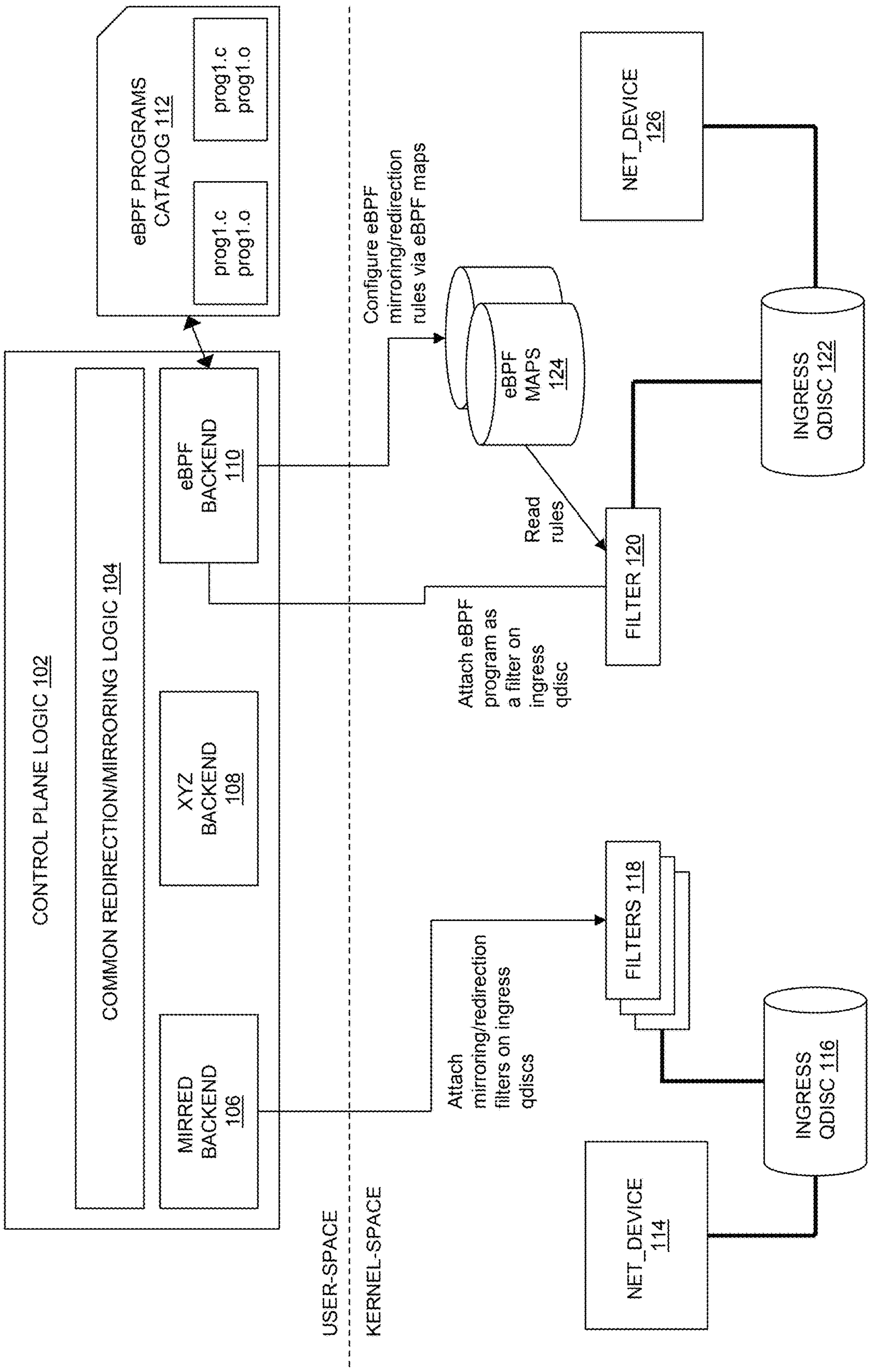
FIG. 1 is a block diagram showing an example of the disclosed traffic mirroring and redirection engine in some embodiments.

Embodiments will now be described with reference to the figures. The embodiments described herein are provided only as examples, in order to illustrate various features and principles of the disclosed technology and are not limiting. The embodiments of the disclosed technology described herein are integrated into a practical solution for sharing a virtual local area network and a subnetwork within a node of a data storage system.

As described further herein, within a storage node having a default network namespace and at least one additional network namespace, a virtual ethernet tunnel is created connecting the default network namespace and the additional network namespace. The virtual ethernet tunnel includes a local virtual ethernet device that is located in the default network namespace and a remote virtual ethernet device that is located in the additional network namespace. A Media Access Control (MAC) address of the remote virtual ethernet device of the virtual ethernet tunnel is changed to a MAC address of a network interface controller of the storage node. A traffic mirroring and redirection engine within the default network namespace is configured to route network packets within the storage node such that a virtual local area network and a subnetwork are shared by the default network namespace and the additional network namespace.

Configuring the traffic mirroring and redirection engine may include creating some number of network packet filters. The network packet filters may include a network packet filter that unconditionally redirects network packets leaving the additional network namespace to the network interface controller of the storage node.

The network packet filters may further include at least one network packet filter that causes all broadcast network packets that are received by the network interface controller of the storage node and that belong to the shared virtual local area network to be mirrored to the additional network namespace.

The network packet filters may further include at least one network packet filter that causes all broadcast network packets that are received by the network interface controller of the storage node and that do not belong to any virtual local area network to be mirrored to the additional network namespace.

The network packet filters may further include at least one network packet filter that causes all network packets that are received by the network interface controller of the storage node and that both belong to the shared virtual local area network and are directed to any one of one or more Internet Protocol (IP) addresses in a set of IP addresses located within the additional network namespace to be redirected to the additional network namespace.

The network packet filters may further include at least one network packet filter that causes all unicast Address Resolution Protocol (ARP) replies received by the network interface controller of the storage node that belong to the shared virtual local area network, and all unicast ARP replies received by the network interface controller of the storage node that do not belong to any virtual local area network, to be mirrored to the additional network namespace.

The network interface controller of the storage node may be a physical network interface controller, or a virtual network interface controller.

Creating the network packet filters may include a control plane within the mirroring and redirection engine attaching the network packet filters to ingress queues of one or more network devices in the storage node.

FIG. 1 is a block diagram showing an example of components in and operation of the disclosed traffic mirroring and redirection engine executing within a storage node. Those components of the traffic mirroring and redirection engine shown in FIG. 1 may, for example, be stored in a memory contained in or allocated to the storage node and may execute on processing circuitry associated with the storage node, such as one or more central processing units within the storage node or within an execution platform on which the storage node executes.

As shown in FIG. 1, the traffic mirroring and redirection engine includes Control Plane Logic 102 that executes in user-space within the storage node. Control Plane Logic 103 includes Common Redirection Logic 104 and one or more backend components. For purposes of illustration, the backend components are shown by Mirred (Mirroring and Redirecting) Backend 106, XYX Backend 108, and eBPF Backend 110. The disclosed traffic mirroring and redirection engine has a plugin-based architecture and may be embodied using one or more plugins such as the backend components shown in FIG. 1, and/or using one or more other backend components.

During operation of the disclosed technology, the traffic mirroring and redirection engine is configured at least in part when the Control Plane 102 (e.g. Common Redirection/Mirroring Logic 104) executes and uses one or more of the backend components to create one or more kernel-space filters. The kernel-space filter or filters that are created are attached (e.g. by one or more of the backend components) to the ingress qdisc of one or more virtual network devices within the storage node.

For example, a kernel of a Linux operating system executing within the storage node includes a traffic control subsystem that supports, for each physical or virtual network device within the storage node, an ingress and an egress queuing discipline ("qdisc"). Each ingress qdisc supports filtering operations through the creation of kernel-space packet filters that are attached to that ingress qdisc. The disclosed technology creates and attaches specific packet filters to ingress qdiscs that intelligently redirect and mirror packets between network devices in the storage node such that a virtual local area network and a subnet are shared between a default network namespace and at least one additional network namespace within the storage node.

The packet filters of the disclosed technology are created and attached using one or more of the backend components. For example, Mirred Backend 106 may attach one or more "mirred" (a mirroring and redirection action available in Linux) filters to an ingress qdisc of one or more virtual network devices, as illustrated in FIG. 1 by Filters 118, Ingress qdisc 116, and Network Device 114. Examples of specific mirred filters used by the disclosed technology are further described below, e.g. with reference to FIG. 4.

In another example, eBPF (extended Berkeley Packet Filter) Backend 110 may attach a filter to an ingress qdisc of one or more virtual network devices, as shown by Filter 120, Ingress qdisc 122, and Network Device 126. In such a case, Filter 120 is an eBPF program from eBPF Programs Catalog 112, and operates to read mirroring/redirection rules from the eBPF Maps 124 that are also configured by eBPF Backend 110.

XYZ Backend 108 is shown to illustrate that the present technology may be embodied using one or more backend component plugins that operate in addition to or as alternatives to the Mirred Backend 106 and/or the eBPF Backend 110.

Figure 2:
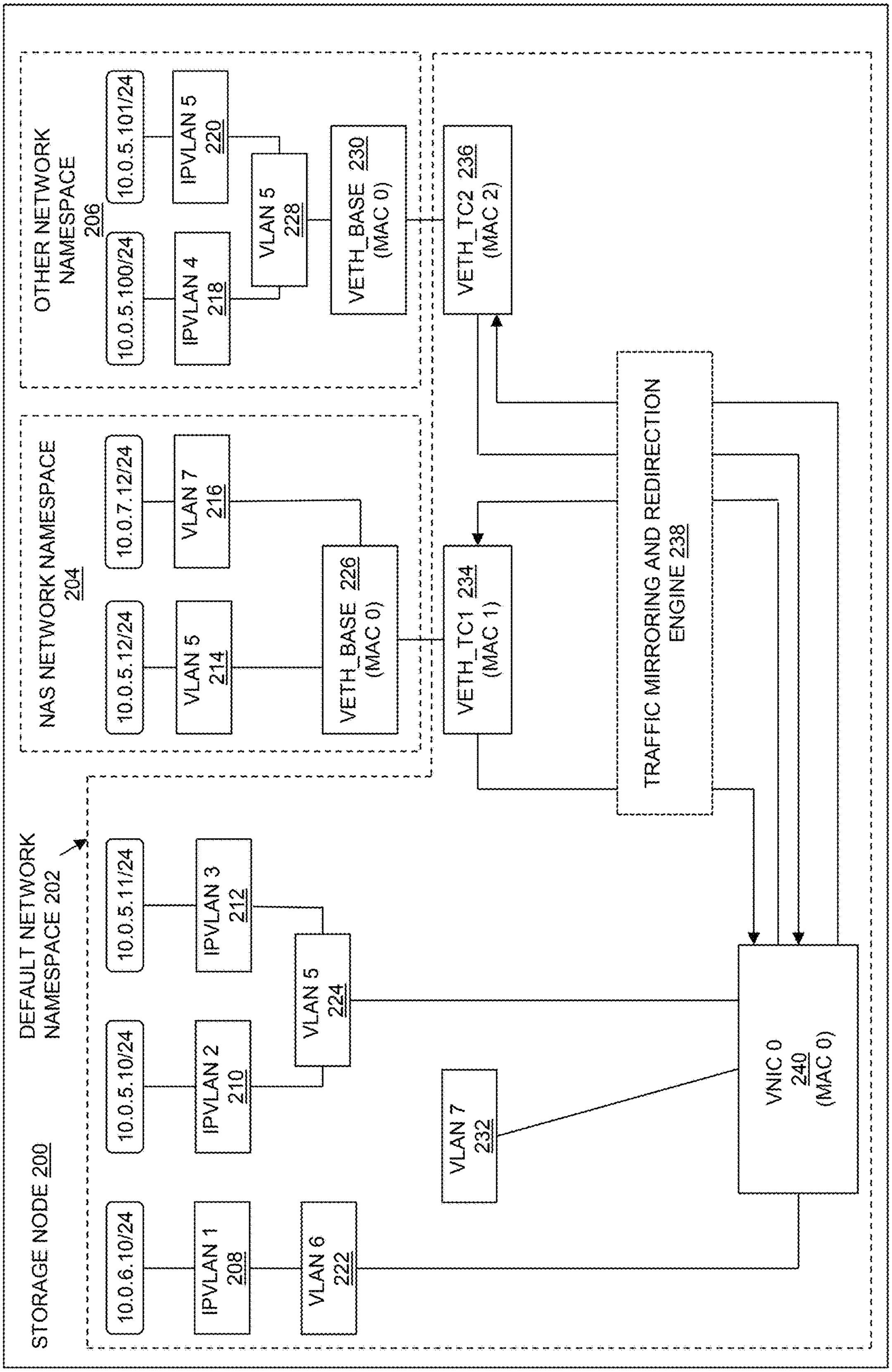
FIG. 2 is a block diagram of a storage node including an illustrative embodiment of the disclosed technology.

FIG. 2 is a block diagram showing components in a Storage Node 200 including an embodiment of the disclosed technology. In the example of FIG. 2, Storage Node 200 includes software components that may be provided in the form of executable program code. When instructions in the program code are executed by processing circuitry associated with the storage node, such as one or more central processing units within the storage node or within an execution platform on which the storage node executes, the processing circuitry is caused to carry out the operations of the software components described herein. Although certain software components are shown in FIG. 2 and described herein for purposes of illustration and explanation, those skilled in the art will recognize that Storage Node 200 also includes various other specific types of software components that are not shown, such as an operating system (e.g. Linux). In some embodiments, one or more host computers and/or host applications executing in whole or in part on external host computers access, through at least one network interface card in Storage Node 200 (e.g. Virtual Network Interface Card (VNIC) 0 240), non-volatile data storage that is served by a data storage system within which Storage Node 200 operates. Storage Node 200 may be embodied as any type of virtual or physical computing device that is capable of processing host I/O requests. For example, through VNIC 0 240, Storage Processor 200 receives and responds to both block-based and file-based host I/O requests. As an alternative to a virtual network interface card such as VNIC 0 240, Storage Node 200 may instead consist of a physical network interface card. Moreover, Storage Node 200 may include one or more additional virtual or physical network interface cards through which the host I/O requests may be received.

Storage Node 200 contains a Default Network Namespace 202, and two additional network namespaces, i.e. NAS (Network Attached Storage) Network Namespace 204 and Other Namespace 206. Default Network Namespace 202 provides a separate network environment within Storage Node 200 for one or more applications that execute in Storage Node 200 and perform processing of block-based host I/O requests that are received by Storage Node 200 through VNIC 0 240. NAS Network Namespace 204 provides a separate network environment within Storage Node 200 for one or more applications that execute in Storage Node 200 and perform processing of file-based host I/O requests that are received by Storage Node 200 through VNIC 0 240. Other Network Namespace 206 provides a separate network environment within Storage Node 200 for one or more other containerized applications that execute in Storage Node 200 and that process other types of requests that are received by Storage Node 200 through VNIC 0 240. NAS Network Namespace 204 may be a network namespace that is created within a software container (e.g. a Docker container, a Kubernetes container, etc.) in which a containerized NAS application executes that performs the processing of file-based host I/O requests received by Storage Node 200. Similarly, Other Network Namespace 206 may be a network namespace that is created within a software container in which another containerized application executes.

Default Network Namespace 202, NAS Network Namespace 204, and Other Network Namespace 206 each contain their own separate network stack that operates independently on top of VNIC 0 240. The network stack in Default Network Namespace 202 includes an interface VLAN 5 224 to a virtual LAN number 5 that is shared by Default Network Namespace 202, NAS Network Namespace 204, and Other Network Namespace 206. The network stack in Default Network Namespace 202 also includes an interface VLAN 6 222 to a virtual LAN number 6 that is used only by Default Network Namespace 202. The network stack in Default Network Namespace 202 also includes interfaces IPVLAN 1 208, IPVLAN 2 210, and IPVLAN 3 212 that are interfaces to three IP (Internet Protocol) VLANs that are used only by Default Network Namespace 202. Further contained within Default Network Namespace 202 are IP addresses 10.0.6.10/24, 10.0.5.10/24 and 10.0.5.11/24 are IP addresses through which the application that performs processing of block-based host I/O requests is accessed, e.g. by block-based I/O requests issued by one or more hosts and directed to those IP addresses.

The network stack in NAS Network Namespace 204 includes an interface VLAN 5 214 to the virtual LAN number 5 that is shared by Default Network Namespace 202, NAS Network Namespace 204, and Other Network Namespace 206. The network stack in NAS Network Namespace 204 also includes an interface VLAN 7 216 to a virtual LAN number 7 that is used only by NAS Network Namespace 204. While virtual LAN number 7 is only used by NAS Network Namespace 204, an interface VLAN 7 232 to virtual LAN number 7 is also included in the Default Network Namespace 202 only for the purpose of causing packets tagged with that virtual LAN number to be passed by VNIC 0 240 through VETH_BASE 226 to NAS Network Namespace 204. Further in NAS Network Namespace 204, the IP addresses 10.0.5.12/24 and 10.0.7.12/24 are IP addresses through which the containerized NAS application that performs processing of file-based host I/O requests is accessed, e.g. by I/O requests issued by one or more hosts and directed to those IP addresses.

The network stack in Other Network Namespace 206 includes an interface VLAN 5 228 to the virtual LAN number 5 that is shared by Default Network Namespace 202, NAS Network Namespace 204, and Other Network Namespace 206. The network stack in Other Network Namespace 206 also includes interfaces IPVLAN 4 218 and IPVLAN 5 220 that are interfaces to two IP (Internet Protocol) VLANs that are used only by Other Network Namespace 206. Further contained within Other Network Namespace 206 are IP addresses 10.0.5.100/24 and 10.0.5.101/24 are IP addresses through which the other containerized application is accessed, e.g. by requests issued by one or more hosts and directed to those IP addresses.

FIG. 2 shows that the disclosed technology allows the network stacks in Default Network Namespace 202, NAS Network Namespace 204, and Other Network Namespace 206 to be configured independently and differently from each other. In this way, the disclosed technology enables those network stacks to advantageously be optimized based on the specific needs of the application(s) that they serve.

The operation of the components shown in FIG. 2 is further described below with additional reference to the steps shown in FIGS. 3 and 4.

Figure 3:
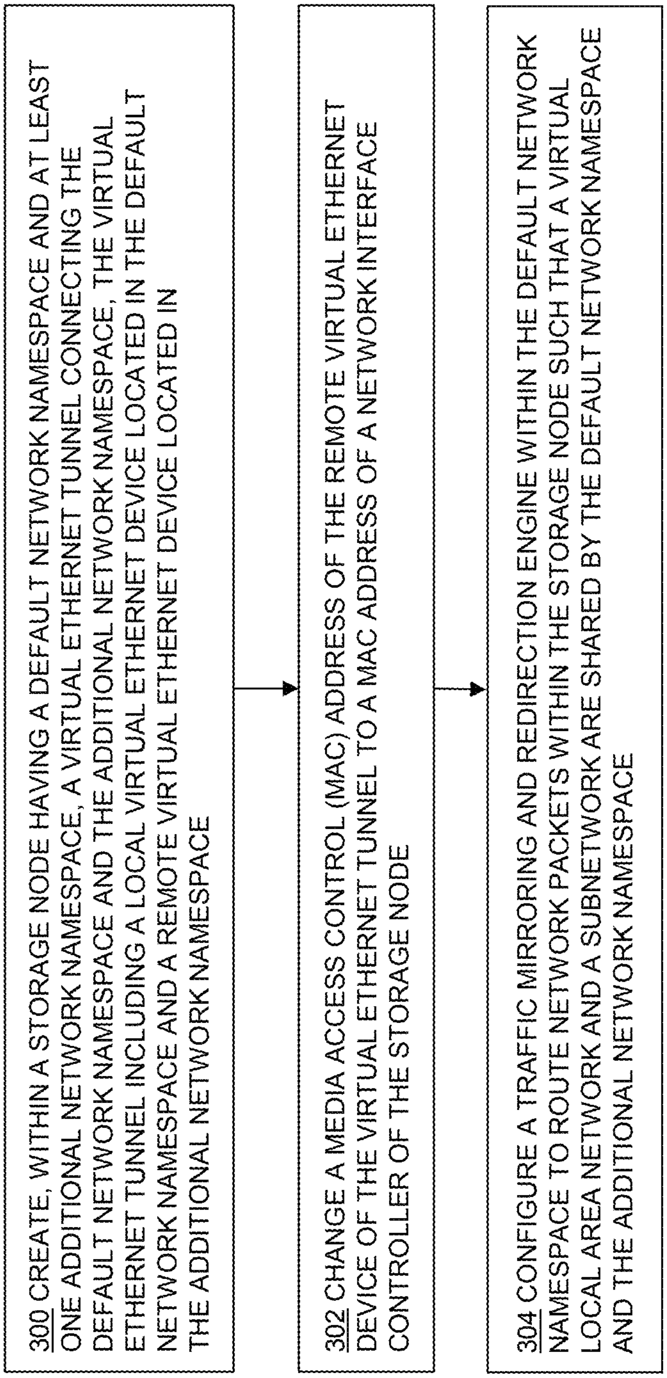
FIG. 3 is a flow chart showing an example of steps performed in some embodiments.

FIG. 3 is a flow chart showing an example of some of the steps performed during operation of the components of the Storage Node 200 shown in FIG. 2. At step 300, Traffic Mirroring and Redirection Engine 238 creates a virtual ethernet tunnel (also known as a "veth device pair" or "veth-pair") that connects Default Network Namespace 202 and NAS Network Namespace 204. For example, the virtual ethernet tunnel that connects Default Network Namespace 202 and NAS Network Namespace 204 may include a local virtual ethernet device located in Default Network Namespace 202 (e.g. VETH_TC1 234), and a remote virtual ethernet device located in the NAS Network Namespace 204 (e.g. VETH_BASE 226). Traffic Mirroring and Redirection Engine 238 also creates a virtual ethernet tunnel that connects Default Network Namespace 202 and Other Network Namespace 206. For example, the virtual ethernet tunnel that connects Default Network Namespace 202 and Other Network Namespace 206 may include a local virtual ethernet device located in Default Network Namespace 202 (e.g. VETH_TC2 236), and a remote virtual ethernet device located in the Other Network Namespace 206 (e.g. VETH_BASE 230).

At step 302, Traffic Mirroring and Redirection Engine 238 changes a MAC (Media Access Control) address of each remote virtual ethernet device of the virtual ethernet tunnels to equal the MAC address of VNIC 0 240. For example, in the case where the MAC address of VNIC 0 240 is referred to as "MAC 0", the MAC address of VETH_BASE 226 is set to MAC 0. Similarly, the MAC address of VETH_BASE 230 is also set to MAC 0. For example, Control Plane Logic 102 may execute Linux commands such as the following to change the MAC addresses of both VETH_BASE 226 and VETH_BASE 230 to equal the MAC address of VNIC 0 240, where $NS1 identifies NAS Network Namespace 204, and $NS2 identifies Other Network Namespace 206:

```
sudo ip netns exec $NS1 ip link set address $MAC dev
    veth_base
sudo ip netns exec $NS2 ip link set address $MAC dev
    veth_base
```

The MAC address of each local virtual ethernet device of the virtual ethernet tunnels is set to its own MAC address that is unique within Default Network Namespace 202, e.g. the MAC address of VETH_TC1 234 is set to a MAC address referred to as "MAC 1", and the MAC address of VETH_TC2 236 is set to a MAC address referred to as "MAC 2". The MAC addresses of the local virtual ethernet devices of the virtual ethernet tunnels are never visible outside of Default Network Namespace 202. Those skilled in the art will recognize that because any network namespace in Storage Node 200 (including the default network namespace) will have exactly one network device with the MAC address MAC 0, so no conflicts will occur.

At step 304, Traffic Mirroring and Redirection Engine 238 is configured to route network packets within Storage Node 200 such that virtual LAN number 5 is shared by Default Network Namespace 202, NAS Network Namespace 204, and Other Network Namespace 206. For example, at step 304 Control Plane Logic 102 creates at least one kernel-space network packet filter. Examples of specific network packet filters that may be created at step 304 are further described below with reference to the steps of FIG. 4.

Figure 4:
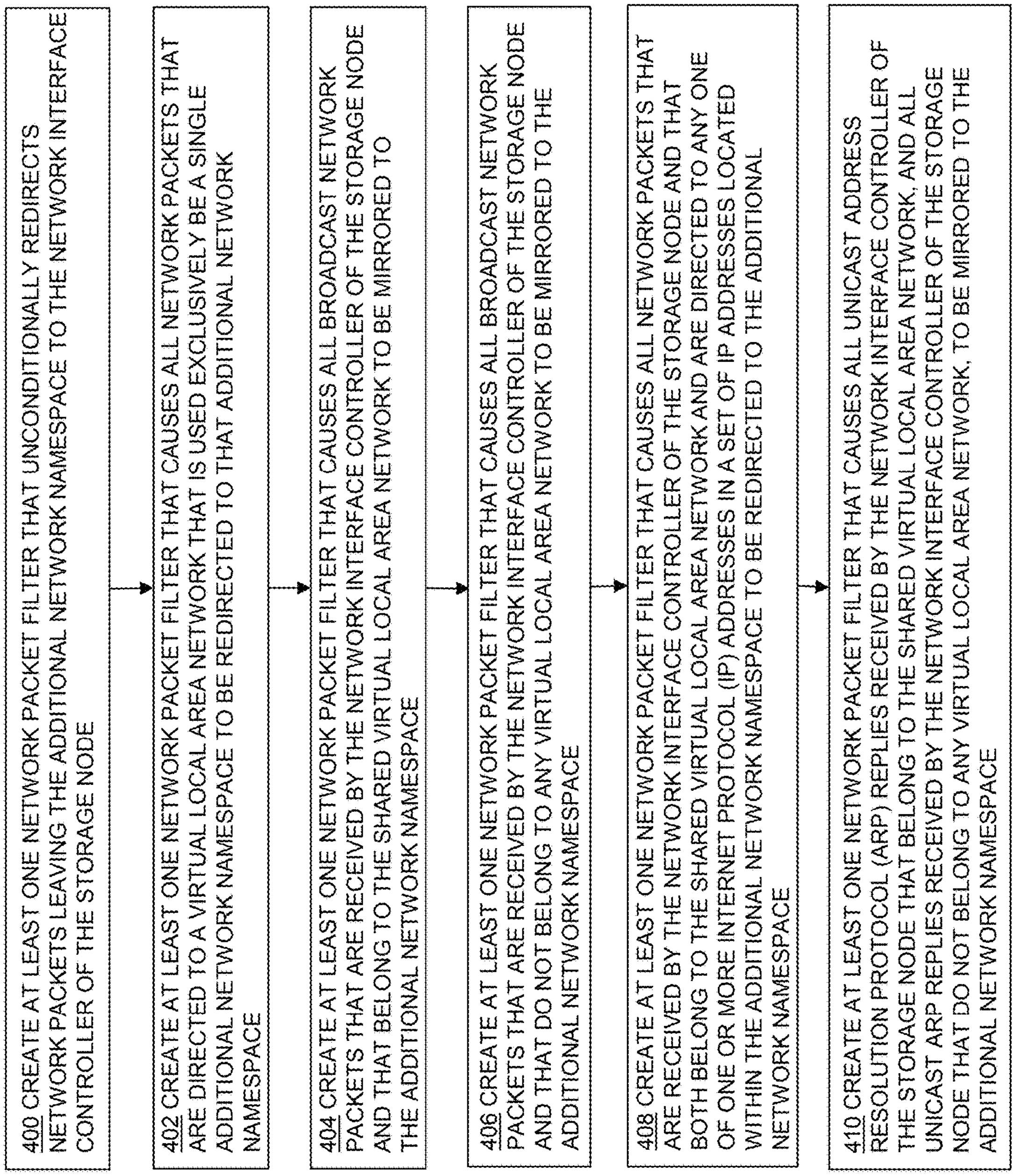
FIG. 4 is another flow chart showing an example of steps performed in some embodiments.

FIG. 4 is another flow chart showing an example of steps performed in some embodiments. At step 400, Traffic Mirroring and Redirection Engine 238 creates at least one network packet filter that unconditionally redirects all network packets leaving NAS Network Namespace 204 and/or Other Network Namespace 206 to the additional network namespace to VNIC 0 240. For example, Control Plane Logic 102 may execute Linux commands such as the following to attach a filter to the ingress qdisc of VETH_TC1 234 that causes all network packets leaving NAS Network Namespace 204 to be unconditionally redirected to VNIC 0 240, and to attach a filter to the ingress qdisc of VETH_TC2 236 that causes all network packets leaving Other Network Namespace 206 to be unconditionally redirected to VNIC 0 240, where VNIC 0 240 is identified by $IF:

```
sudo tc qdisc add dev veth_tc1 handle ffff: ingress
sudo tc filter add dev veth_tc1 parent ffff: matchall
    skip_hw action mirred egress redirect dev $IF
sudo tc qdisc add dev veth_tc2 handle ffff: ingress
sudo the filter add dev veth_tc2 parent ffff: matchall
    skip_hw action mirred egress redirect dev $IF
```

At step 402, Traffic Mirroring and Redirection Engine 238 creates at least one network packet filter that causes all network packets received by VNIC 0 240 that are directed to a virtual local area network that is used exclusively be a single additional network namespace to be redirected to that additional network namespace. In the example of FIG. 2, virtual LAN number 7 is used exclusively by NAS Network Namespace 204. Accordingly, all network packets received by VNIC 0 240 are caused to be redirected to NAS Network Namespace 204 by executing Linux commands such as the following to attach a filter to the ingress qdisc of VNIC 0 240 that causes all network packets in the virtual LAN number 7 that are received by VNIC 0 240 to be redirected to VETH_TC1 234:

```
sudo tc qdisc add dev $IF handle ffff: ingress
sudo tc filter add dev $IF parent ffff: protocol 802.1Q
    basic match "meta (vlan mask 0x00000fff eq 7)" action
    mirred egress redirect dev veth_tc1
```

At step 404, Traffic Mirroring and Redirection Logic 238 creates at least one network packet filter that causes all broadcast network packets that are received by VNIC 0 240 and that belong to the shared virtual LAN to be mirrored to the additional network namespaces, e.g. that causes all broadcast network packets that are received by VNIC 0 240 and that belong to virtual LAN number 5 to be mirrored to both NAS Network Namespace 204 and Other Network Namespace 206. Mirroring is used because virtual LAN number 5 is also shared with Default Network Namespace 202. For example, all broadcast network packets that are received by VNIC 0 240 and that belong to virtual LAN number 5 may be caused to be mirrored to both NAS Network Namespace 204 and Other Network Namespace 206 by executing Linux commands such as the following that attach filters to the ingress qdisc of VNIC 0 240 that cause all broadcast network packets received by VNIC 0 240 that belong to virtual LAN number 5 to be mirrored to both VETH_TC1 234 and VETH_TC2 236:

sudo tc filter add dev $IF parent ffff: protocol 802.1Q basic match "meta (vlan mask 0x00000fff eq 5) and cmp (u8 at 0 layer link mask 0x1 eq 0x1)" action mirred egress mirror dev veth_tc1 sudo tc filter add dev $IF parent ffff: protocol 802.1Q basic match "meta (vlan mask 0x00000fff eq 5) and cmp (u8 at 0 layer link mask 0x1 eq 0x1)" action mirred egress mirror dev veth_tc2

At step 406, Traffic Mirroring and Redirection Logic 238 creates at least one network packet filter that causes all broadcast network packets that are received by VNIC 0 240 and that do not belong to any virtual LAN to be mirrored to all the additional network namespaces, e.g. that causes all broadcast network packets that are received by VNIC 0 240 and that do not belong to any virtual LAN to be mirrored to both NAS Network Namespace 204 and Other Network Namespace 206. Mirroring is again used because such packets are also directed to Default Network Namespace 202. For example, all broadcast network packets that are received by VNIC 0 240 and that do not belong to any virtual LAN may be caused to be mirrored to both NAS Network Namespace 204 and Other Network Namespace 206 by executing Linux commands such as the following that attach filters to the ingress qdisc of VNIC 0 240 that cause all broadcast network packets received by VNIC 0 240 that do not belong to any virtual LAN to be mirrored to both VETH_TC1 234 and VETH_TC2 236:

sudo tc filter add dev $IF parent ffff: protocol all basic match "not (meta (vlan mask 0x00000fff gt 0) and meta (vlan mask 0x00000fff lt 4096)) and cmp (u8 at 0 layer link mask 0x1 eq 0x1)" action mirred egress mirror dev veth_tc1 sudo tc filter add dev $IF parent ffff: protocol all basic match "not (meta (vlan mask 0x00000fff gt 0) and meta (vlan mask 0x00000fff lt 4096)) and cmp (u8 at 0 layer link mask 0x1 eq 0x1)" action mirred egress mirror dev veth_tc2

At step 408, Traffic Mirroring and Redirection Logic 238 creates at least one network packet filter that causes all network packets that are received by VNIC 0 240 and that both belong to the shared virtual LAN and are directed to any one of the IP addresses located in the additional network namespaces to be redirected to the appropriate additional network namespace, e.g. that causes all received network packets belonging to virtual LAN number 5 that are directed to an IP address located in NAS Network Namespace 204 (e.g. received network packets having a destination IP address of either 10.0.5.12/24 or 10.0.7.12/24) to be redirected to NAS Network Namespace 204, and causes all received network packets belonging to virtual LAN number 5 that are directed to an IP address located in Other Network Namespace 206 (e.g. received network packets having a destination IP address of either 10.0.5.100/24 or 10.0.5.10/24) to be redirected to Other Network Namespace 206. Redirection is used since such packets are not directed to Default Network Namespace 202. Linux ipsets may be used in this regard. For example, all network packets that are received by VNIC 0 240 and that both belong to the shared virtual LAN and are directed to any one of the IP addresses located in the additional network namespaces may be redirected to the appropriate additional network namespace by executing Linux commands such as the following that attach filters to the ingress qdisc of VNIC 0 240 that cause network packets received by VNIC 0 240 that belong to virtual LAN number 5 and have a destination IP address located in NAS Network Namespace 204 to be redirected to VETH_TC1 234, and cause network packets received by VNIC 0 240 that belong to virtual LAN number 5 and have a destination IP address located in Other Network Namespace 206 to be redirected to VETH_TC2 236:

sudo tc filter add dev $IF parent ffff: protocol 802.1Q basic match "meta (vlan mask 0x00000fff eq 5) and ipset(tc1_vlan5_v4 dst)" action mirred egress redirect dev veth_tc1 sudo tc filter add dev $IF parent ffff: protocol 802.1Q basic match "meta (vlan mask 0x00000fff eq 5) and ipset(tc1_vlan5_v6 dst)" action mirred egress redirect dev veth_tc1 sudo tc filter add dev $IF parent ffff: protocol 802.1Q basic match "meta (vlan mask 0x00000fff eq 5) and ipset(tc2_vlan5_v4 dst)" action mirred egress redirect dev veth_tc2 sudo tc filter add dev $IF parent ffff: protocol 802.1Q basic match "meta (vlan mask 0x00000fff eq 5) and ipset(tc2_vlan5_v6 dst)" action mirred egress redirect dev veth_tc2

For each shared virtual LAN, Control Plane Logic 102 populates a ipset corresponding to every sharing network namespace. If IPv6 is in use, then an ipset for IPV6 is also maintained. For example, with reference to the example in FIG. 2, Control Plane Logic 102 may create and populate the necessary ipsets corresponding to NAS Network Namespace 204 and Other Network Namespace 206 for virtual LAN number 5 by executing Linux commands such as the following:

sudo ipset create tc1_vlan5_v4 iphash family inet
sudo ipset add tc1_vlan5_v4 10.0.5.12
sudo ipset create tc2_vlan5_v4 iphash family inet
sudo ipset add tc2_vlan5_v4 10.0.5.100
sudo ipset add tc2_vlan5_v4 10.0.5.101

Control Plane Logic 102 maintains a record of the IP addresses that are currently located within each network namespace and makes changes to the corresponding ipsets as needed. If IP addresses are configured in a centralized way, then Control Plane Logic 102 will be alerted when an IP address is set in any namespace. If a network manager is able to manage part of the shared subnet, then Control Plane Logic 102 may monitor IP addition and removal events in all additional network namespaces via netlink or the like to obtain notifications and update the ipsets as needed. Alternatively, in embodiments in which an eBPF filter is used instead of mirred filters, Control Plane Logic 102 populates eBPF maps instead of ipsets.

At step 410, Traffic Mirroring and Redirection Logic 238 creates at least one network packet filter that causes all unicast Address Resolution Protocol (ARP) replies that are received by VNIC 0 240 and that either i) belong to the shared virtual LAN (e.g. virtual LAN number 5), or ii) do not belong to any virtual LAN, to be mirrored to the additional network namespaces. For example, in the example of FIG. 2, this may be accomplished by executing Linux commands such as the following that attach filters to the ingress qdisc of VNIC 0 240:

sudo tc filter add dev $IF parent ffff: protocol 802.1Q basic match "meta (vlan mask 0x00000fff eq 5) and cmp (u16 at 12 layer link eq 0x0806)" action mirred egress mirror dev veth_tc1

```
sudo tc filter add dev $IF parent ffff: protocol 802.1Q
    basic match "meta (vlan mask 0x00000fff eq 5) and
    cmp (u16 at 12 layer link eq 0x0806)" action mirred
    egress mirror dev veth_tc2
sudo tc filter add dev $IF parent ffff: protocol arp basic
    action mirred egress mirror dev veth_tc1
sudo tc filter add dev $IF parent ffff: protocol arp basic
    action mirred egress mirror dev veth_tc2
```

Traffic Mirroring and Redirection Logic 238 may execute more specific Linux commands that provide more specific matching in the filters, e.g. that look for ARP replies for specific IP addresses that are tracked in ipsets. Such alternative operation may allow switching from mirroring to redirection of the packets, possibly resulting in performance benefits that are deployment or implementation specific.

While for purposes of concise illustration and explanation the example of FIG. 2 is shown and described using a single physical or virtual NIC, those skilled in the art will recognize that the disclosed technology is not so limited. Storage nodes typically have more than one NIC, and the disclosed technology is fully compatible with the use of multiple NICs. For example, Traffic Mirroring and Redirection Logic 238 may operate by creating a virtual ethernet tunnel for every NIC that needs to be exposed to a given additional network namespace.

The disclosed technology is also fully compatible with storage nodes having bond interfaces that aggregate multiple physical NICs. In such a configuration, Control Plane Logic 102 does not operate with regard to individual NICs, but instead operates with regard to the bond interface.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:

creating, within a storage node having a default network namespace and at least one additional network namespace, a virtual ethernet tunnel connecting the default network namespace and the additional network namespace, the virtual ethernet tunnel including a local virtual ethernet device located in the default network namespace and a remote virtual ethernet device located in the additional network namespace;

changing a Media Access Control (MAC) address of the remote virtual ethernet device of the virtual ethernet tunnel to a MAC address of a network interface controller of the storage node; and configuring a traffic mirroring and redirection engine within the default network namespace to route network packets within the storage node such that a virtual local area network and a subnetwork are shared by the default network namespace and the additional network namespace, wherein configuring the traffic mirroring and redirection engine includes creating at least one network packet filter, wherein the at least one network packet filter includes a network packet filter that unconditionally redirects network packets leaving the additional network namespace to the network interface controller of the storage node.

2. The method of claim 1, wherein the at least one network packet filter further includes at least one network packet filter that causes all broadcast network packets that are received by the network interface controller of the storage node and that belong to the shared virtual local area network to be mirrored to the additional network namespace.

3. The method of claim 2, wherein the at least one network packet filter further includes at least one network packet filter that causes all broadcast network packets that are received by the network interface controller of the storage node and that do not belong to any virtual local area network to be mirrored to the additional network namespace.

4. The method of claim 3, wherein the at least one network packet filter further includes at least one network packet filter that causes all network packets that are received by the network interface controller of the storage node and that both belong to the shared virtual local area network and are directed to any one of one or more Internet Protocol (IP) addresses in a set of IP addresses located within the additional network namespace to be redirected to the additional network namespace.

5. The method of claim 4, wherein the at least one network packet filter further includes at least one network packet filter that causes all unicast Address Resolution Protocol (ARP) replies received by the network interface controller of the storage node that belong to the shared virtual local area network, and all unicast ARP replies received by the network interface controller of the storage node that do not belong to any virtual local area network, to be mirrored to the additional network namespace.

6. The method of claim 1, wherein the network interface controller of the storage node comprises a physical network interface controller.

7. The method of claim 1, wherein the network interface controller of the storage node comprises a virtual network interface controller.

8. The method of claim 1, wherein creating the at least one network packet filter is performed at least in part by a control plane within the mirroring and redirection engine, and wherein the method further includes attaching the at least one network packet filter to an ingress queue of at least one network device in the storage node.

9. A system comprising:

processing circuitry and memory coupled to the processing circuitry, the memory storing instructions, wherein the instructions, when executed by the processing circuitry, cause the processing circuitry to:

create, within a storage node having a default network namespace and at least one additional network namespace, a virtual ethernet tunnel connecting the default network namespace and the additional network namespace, the virtual ethernet tunnel including a local virtual ethernet device located in the default network namespace and a remote virtual ethernet device located in the additional network namespace;

change a Media Access Control (MAC) address of the remote virtual ethernet device of the virtual ethernet tunnel to a MAC address of a network interface controller of the storage node; and configure a traffic mirroring and redirection engine within the default network namespace to route network packets within the storage node such that a virtual local area network and a subnetwork are shared by the default network namespace and the additional network namespace, at least in part by causing the processing circuitry to create at least one network packet filter, wherein the at least one network packet filter includes a network packet filter that unconditionally redirects network packets leaving the additional network namespace to the network interface controller of the storage node.

10. The system of claim 9, wherein the at least one network packet filter further includes at least one network packet filter that causes all broadcast network packets that are received by the network interface controller of the storage node and that belong to the shared virtual local area network to be mirrored to the additional network namespace.

11. The system of claim 10, wherein the at least one network packet filter further includes at least one network packet filter that causes all broadcast network packets that are received by the network interface controller of the storage node and that do not belong to any virtual local area network to be mirrored to the additional network namespace.

12. The system of claim 11, wherein the at least one network packet filter further includes at least one network packet filter that causes all network packets that are received by the network interface controller of the storage node and that both belong to the shared virtual local area network and are directed to any one of one or more Internet Protocol (IP) addresses in a set of IP addresses located within the additional network namespace to be redirected to the additional network namespace.

13. The system of claim 12, wherein the at least one network packet filter further includes at least one network packet filter that causes all unicast Address Resolution Protocol (ARP) replies received by the network interface controller of the storage node that belong to the shared virtual local area network, and all unicast ARP replies received by the network interface controller of the storage node that do not belong to any virtual local area network, to be mirrored to the additional network namespace.

14. The system of claim 9, wherein the network interface controller of the storage node comprises a physical network interface controller.

15. The system of claim 9, wherein the network interface controller of the storage node comprises a virtual network interface controller.

16. The system of claim 10, wherein creation of the at least one network packet filter is performed at least in part by a control plane within the mirroring and redirection engine, and wherein the method further includes attaching the at least one network packet filter to an ingress queue of at least one network device in the storage node.

17. A computer program product including a non-transitory computer readable medium having instructions stored thereon, wherein the instructions, when executed on processing circuitry, cause the processing circuitry to perform steps including:

creating, within a storage node having a default network namespace and at least one additional network namespace, a virtual ethernet tunnel connecting the default network namespace and the additional network namespace, the virtual ethernet tunnel including a local virtual ethernet device located in the default network namespace and a remote virtual ethernet device located in the additional network namespace;

changing a Media Access Control (MAC) address of the remote virtual ethernet device of the virtual ethernet tunnel to a MAC address of a network interface controller of the storage node; and configuring a traffic mirroring and redirection engine within the default network namespace to route network packets within the storage node such that a virtual local area network and a subnetwork are shared by the default network namespace and the additional network namespace, wherein configuring the traffic mirroring and redirection engine includes creating at least one network packet filter, wherein the at least one network packet filter includes a network packet filter that unconditionally redirects network packets leaving the additional network namespace to the network interface controller of the storage node.

* * * * *